United States Patent
Tulett et al.

(10) Patent No.: US 8,559,267 B2
(45) Date of Patent: Oct. 15, 2013

(54) METHODS AND APPARATUS OF BOREHOLE SEISMIC SURVEYS

(75) Inventors: John Richard Tulett, Yokohama (JP); James Edward Martin, The Spinney Cottenham (GB); Emmanuel Coste, Oslo (NO); Colin Wilson, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 1208 days.

(21) Appl. No.: 12/146,453

(22) Filed: Jun. 26, 2008

(65) Prior Publication Data
US 2009/0073805 A1 Mar. 19, 2009

Related U.S. Application Data

(63) Continuation-in-part of application No. 11/552,970, filed on Oct. 26, 2006, now Pat. No. 7,974,150.

(60) Provisional application No. 60/946,990, filed on Jun. 29, 2007.

(51) Int. Cl.
*G01V 1/38* (2006.01)

(52) U.S. Cl.
USPC .................. 367/24; 367/15; 367/14; 367/902

(58) Field of Classification Search
USPC ............ 181/111, 112, 115, 118, 120; 367/15, 367/20, 21, 23, 24, 57, 141, 144, 153, 154; 702/17
See application file for complete search history.

(56) References Cited

U.S. PATENT DOCUMENTS

| | | | | |
|---|---|---|---|---|
| 3,274,608 A | * | 9/1966 | Stockel, Jr. et al. | 346/33 R |
| 3,331,050 A | * | 7/1967 | Kilmer et al. | 367/23 |
| 4,493,061 A | * | 1/1985 | Ray | 367/23 |
| 4,735,281 A | * | 4/1988 | Pascouet | 181/115 |
| 4,935,903 A | | 6/1990 | Sanders et al. | |
| 4,958,328 A | | 9/1990 | Stubblefield | |
| 4,979,150 A | | 12/1990 | Barr | |
| 5,142,498 A | * | 8/1992 | Duren | 367/15 |

(Continued)

FOREIGN PATENT DOCUMENTS

| | | | |
|---|---|---|---|
| GB | 2084323 A | * | 4/1982 |
| WO | 95/13549 | | 5/1995 |
| WO | 2005/121837 | | 12/2005 |
| WO | 2006/131745 | | 12/2006 |

OTHER PUBLICATIONS

A. Kemal, A. Ozbek, E. Kargh, J. Robertson, "Optimized deghosting of over/under towed-streamer data in the presence of noise", The Leading Edge, Feb. 2008, pp. 190-199.

(Continued)

*Primary Examiner* — Isam Alsomiri
*Assistant Examiner* — Daniel L Murphy
(74) *Attorney, Agent, or Firm* — Jianguang Du; Jody DeStefanis

(57) ABSTRACT

Methods and apparatus for borehole seismic survey are disclosed comprising a first seismic source under water at a first location and a second seismic source at a second, deeper location. Seismic signals from the seismic sources are recorded with synchronized sensors located in a borehole and source signature data are obtained by combining the recorded seismic signals such that low and high frequency content of the combined source signature data is extended relative to the source signature of the first seismic source and the second seismic source.

30 Claims, 13 Drawing Sheets

(56) References Cited

U.S. PATENT DOCUMENTS

| | | | |
|---|---|---|---|
| 5,581,514 A | | 12/1996 | Moldoveanu et al. |
| 5,587,965 A | | 12/1996 | Dragoset, Jr. et al. |
| 5,973,995 A | * | 10/1999 | Walker et al. .................. 367/20 |
| 5,995,905 A | | 11/1999 | Ikelle et al. |
| 6,493,636 B1 | * | 12/2002 | DeKok .......................... 702/17 |
| 6,961,284 B2 | * | 11/2005 | Moldoveanu ................. 367/154 |
| 2003/0081501 A1 | * | 5/2003 | Nightingale et al. ........... 367/57 |
| 2004/0136266 A1 | * | 7/2004 | Howlid et al. ................. 367/21 |
| 2004/0228214 A1 | * | 11/2004 | Tulett ............................ 367/15 |
| 2006/0262645 A1 | | 11/2006 | Baaren |
| 2007/0097788 A1 | | 5/2007 | Tang et al. |

OTHER PUBLICATIONS

B. Dragoset and J. Gabitzsch, "Introduction to this special section: Low-frequency seismic", The Leading Edge, Jan. 2007, pp. 34-35.

N. Moldoveanu, L. Combee, M. Egan, G. Hampson, L. Sydora, W. Abriel, "Over/under towed-streamer acquisition: A method to extend seismic bandwidth to both higher and lower frequencies", The Leading Edge, Jan. 2007, pp. 41-58.

\* cited by examiner

METHODS AND APPARATUS OF BOREHOLE SEISMIC SURVEYS

RELATED APPLICATIONS

This application claims priority of U.S. Provisional Patent Application Ser. No. 60/946,990, filed 29 Jun. 2007, and entitled "Methods and Apparatus of Source Control for Sequential Firing of Staggered Air Gun Arrays in Borehole Seismic", and is a continuation-in-part of U.S. patent application Ser. No. 11/552,970, filed 26 Oct. 2006, and entitled "Methods and Apparatus of Source Control for Sequential Firing of Staggered Air Gun Arrays in Borehole Seismic", the entire contents of which are incorporated herein by reference.

FIELD

The present invention relates generally to methods and apparatus for exploring subsurface formations. More particularly, the present disclosure relates to methods and apparatus for improved borehole seismic utilizing techniques that extend the low and high frequency content of source signature in vertical seismic profile (VSP) surveys.

BACKGROUND

Seismic exploration is widely used to locate geologic formations for hydrocarbon accumulations. Subsurface formation analysis has enabled more efficient oil and gas recovery over the past several decades. In recent years, petroleum exploration has been occurring at increasingly deeper levels of water. As the water levels increase and the wells drilled lengthen, the subsurface formations often become more complex. To facilitate more efficient petroleum recovery, it is often desirable to generate a vertical seismic profile.

A vertical seismic profile (VSP) is a class of borehole seismic measurements used for correlation between surface seismic receivers and wireline logging data. VSPs can be used to tie surface seismic data to well data, providing a useful tie to measured depths. Typically VSPs yield higher resolution data than surface seismic profiles provide. VSPs enable converting seismic data to zero-phase data as well as enable distinguishing primary reflections from multiples. In addition, a VSP is often used for analysis of portions of a formation ahead of the drill bit.

Narrowly defined, VSP refers to measurements made in a vertical wellbore using acoustic receivers inside the wellbore and a seismic source at the surface near the well. In a more general context as used herein, however, VSPs vary in well configuration, the number and location of sources and acoustic receivers, and how they are deployed. Nevertheless, VSP does connote the deployment of at least some receivers in the wellbore. Most VSPs use a surface seismic source, which is commonly a vibrator on land, or an airgun, marine vibrator, watergun, or other in-sea seismic source in marine environments.

There are various VSP configurations including zero-offset VSP, offset VSP, walkaway VSP, vertical incidence VSP, salt-proximity VSP, multi-offset VSP, and drill-noise or seismic-while-drilling VSP. Checkshot surveys are similar to VSP in that acoustic receivers are placed in the borehole and a surface source is used to generate an acoustic signal. However, a VSP is a more detailed than a checkshot survey. The VSP receivers are typically more closely spaced than those in a checkshot survey; checkshot surveys may include measurement intervals hundreds of meters apart. Further, a VSP uses the reflected energy contained in the recorded trace at each receiver position as well as the first direct path from source to receiver while the checkshot survey uses only the direct path travel time.

While VSPs can provide valuable information about a formation, source perturbations (e.g., shot to shot variations in the seismic signature of an airgun) introduce error into the raw seismic data which percolates through the processing chain to the final images produced. VSP source perturbations can limit the full range of usefulness that VSP data can provide.

Further, some seismic systems include a cluster or array of airguns. Some of these systems fire all of the airguns simultaneously. The intent of the multiple airguns is to increase the amplitude of the seismic signal. However, the vertical spacing between the airguns and sea-surface results in an offset of the signals and what is sometimes referred to as "ghosting."

In consequence of the factors discussed above, and others that are known in the art, data acquired in marine borehole seismic often does not record with sufficient signal fidelity to be useful, i.e., the frequency content of the source signature is compromised. Typically, currently available techniques correct only gross errors in VSP source data. Therefore, in some instances sophisticated seismic data processing methods may not be used because current borehole seismic methods and apparatus do not consistently provide VSP seismic source data with the precision necessary to make sophisticated processing meaningful.

SUMMARY

The present disclosure addresses at least some of the above-described needs and others. In this, typically a high-resolution, i.e., a high frequency, source is used for purposes of imaging shallow reservoirs, whereas a deep penetrating, i.e., a low frequency, source is used for purposes of imaging deep reservoirs. In some instances, the source that is chosen is a compromise between the high frequency and the low frequency, in particular, for VSP surveys over a long borehole distance interval. The present inventors have developed the techniques described herein to extend the frequency content of source signature data such that the low and high frequency content is improved.

The present inventors have recognized that in a rig or other stationary VSP survey, it would be possible and convenient to vertically deploy a long length source from the stationary platform. The present inventors recognized that such a VSP-type environment provides a unique opportunity to use a novel source configuration comprising three or more sources in an "over-under-under" source configuration. In contrast with other marine seismic surveys, in borehole seismic the predetermined fixed geometry and position of the source array provide improved stable results by application of over-under algorithmic techniques.

The inventors further recognized that although a long length source would not be feasible in some types of marine survey, it would be highly effective in providing improved source signature in a VSP-type survey. As described herein, triple level source configurations (or more) at, for example, 3 m/6 m/9 m or 4 m/8 m/12 m or other depth combinations, might be deployed to provide a wide, smooth bandwidth source with smoothing out and minimizing of ghost notches in the frequency domain.

The present inventors further recognized that aeration in the water from the source firing changes the water velocity of the pressure waves generated by the source. As used herein, the phrase "water velocity" refers to the velocity of acoustic pressure waves in water. This aeration effect in turn changes the frequency of the ghost notches. In this, when the recorded seismic data is stacked, or compared with a previous record, a smearing of the spectral content of the seismic data is evident. The present inventors have proposed a novel technique for controlling the firing of the source configurations, for example, an over-under-under type source configuration, such that individual sources of the configuration are fired only at a predetermined water velocity. In this, the present disclosure contemplates determining a stabilization time for sequential or staggered firing of seismic sources such that the sources are fired only if the water velocity of the acoustic pressure waves is within a predetermined range. The present inventors have recognized that the techniques proposed herein ensure that multiple ghost notch frequencies remain constant over a frequency bandwidth of interest.

The present disclosure also contemplates use of a far field hydrophone to record acoustic pressure waves from the source array in the far field. Such far field signature data may be utilized in subsequent downstream data processing of the recorded seismic survey signals and/or may be utilized for purposes of quality control (QC) of the source signatures by fine tuning the firing of the source array. In addition, or in combination, data from seismic sensors local to the seismic sources may be utilized to estimate the far field signature for purposes of downstream data processing and/or QC of the source signatures.

One embodiment disclosed herein provides a method of borehole seismic survey comprising deploying a first seismic source and a second seismic source at or near a sea surface at predetermined fixed locations relative to one or more sensors located in a borehole; synchronizing seismic source firing with the borehole sensors recording so that seismic waves generated by the seismic sources are received by the borehole sensors; firing the first seismic source under water at a first location; recording first seismic signals from the first seismic source with the borehole sensors; firing the second seismic source at a second, deeper location; recording second seismic signals from the second seismic source with the borehole sensors; obtaining source signature data by combining the recorded first seismic signals and second seismic signals, wherein low and high frequency content of the combined source signature data is extended relative to the source signature of the first seismic source and the second seismic source.

Aspects of the present disclosure include firing additional seismic sources; recording additional seismic signals from the additional seismic sources with the borehole sensors; and combining the recorded additional seismic signals. In other aspects disclosed herein, at least three seismic sources are sequentially fired under water at different corresponding depths. The recorded seismic signals may be combined using a deghosting algorithm such as a shift and sum algorithm or a Postumus algorithm. The low and high frequency content of the combined source signature data may be from about 5 Hz to about 250 Hz. In aspects of the present disclosure combining the recorded seismic signals comprises smoothing out and minimizing ghost notches in the frequency domain so as to extend the low and high frequency content of the combined source signature data.

In certain embodiments, a method comprises monitoring velocity of acoustic pressure waves in water based on recorded seismic signals; and controlling a firing sequence of the seismic sources based on the monitored water velocity of the pressure waves. The firing sequence may be controlled based on a determined stabilization time such that the water velocity of the pressure waves is within a predetermined range. The first and second seismic sources may be fired at a constant, absolute firing height of the seismic sources to compensate for variations in marine conditions.

In aspects of the present disclosure the first and second seismic sources may comprise airguns, marine vibrators, and/or waterguns. The source signature data are utilized for purposes of marine VSP survey using wireline, while-drilling, or permanent monitoring systems. In yet other aspects of the present disclosure, a method comprises firing multiple shots with a plurality of seismic sources; and combining the recorded seismic signals, wherein the plurality of seismic sources are fired consecutively with a source at a deeper location being fired after a source at a shallower location.

In certain embodiments of the present disclosure, a borehole seismic survey system comprises at least a first seismic sensor configured or designed for deployment in a borehole; a first seismic source configured or designed for deployment under water at a predetermined fixed first location relative to the borehole sensor; a second seismic source configured or designed for deployment under water at a predetermined fixed second, deeper location spaced vertically from the first seismic source relative to the borehole sensor; a controller operatively connected to the first and second seismic sources and the first seismic sensor and configured or designed to synchronize the firing of the first and second seismic sources with borehole sensor recording, wherein the system is programmed to record first seismic signals and second seismic signals received by the borehole seismic sensor from the first seismic source and the second seismic source, respectively, and to obtain source signature data by combining the recorded first seismic signals and second seismic signals such that low and high frequency content of the combined source signature data is extended relative to the source signature of the first seismic source and the second seismic source.

In some embodiments, a seismic system comprises a third seismic source configured or designed to be deployed at a predetermined fixed third location spaced vertically from the second seismic source, wherein the controller is programmed to consecutively fire the first, second and third seismic sources such that a source at a deeper location is fired after a source at a shallower location. In yet other aspects herein, the controller is programmed to fire the seismic sources based on velocity of acoustic pressure waves in water and/or a constant, absolute firing height of the seismic sources to compensate for variations in marine conditions. A far-field hydrophone may be configured or designed for deployment at a distance from the seismic sources.

In other embodiments disclosed herein, a borehole seismic survey system comprises a plurality of receivers deployed in a subsea borehole; a seismic source array aligned vertically in-sea at or near the sea surface such that each source of the source array is located at a corresponding predetermined fixed location relative to the borehole receivers; an in-sea source controller configured to synchronize the firing of the seismic source array with borehole receiver recording and to sequentially fire the individual sources of the seismic source array such that at least first seismic signals and second seismic signals are received by the borehole receivers from a first seismic source and a second seismic source of the seismic source array, wherein the borehole seismic survey system is configured to combine the recorded first seismic signals and second seismic signals such that low and high frequency content of combined source signature data is extended relative to the source signature of the first seismic source and the second seismic source.

In some aspects a survey system may comprise a synchronization unit operatively connected to the plurality of receivers and the controller, wherein the synchronization unit synchronizes the sequential source firing with recording of the plurality of receivers deployed in the subsea borehole. In other aspects an in-sea source controller may be configured to dynamically change the sequential firing of the individual sources of the seismic source array based one or more of velocity of acoustic pressure waves in water; and a constant, absolute firing height of the seismic sources to compensate for variations in marine conditions.

BRIEF DESCRIPTION OF THE DRAWINGS

The accompanying drawings illustrate certain embodiments and are a part of the specification.

In FIG. 1B the rig is shown supporting a survey apparatus with a float at a wave peak.

Figure 1A:
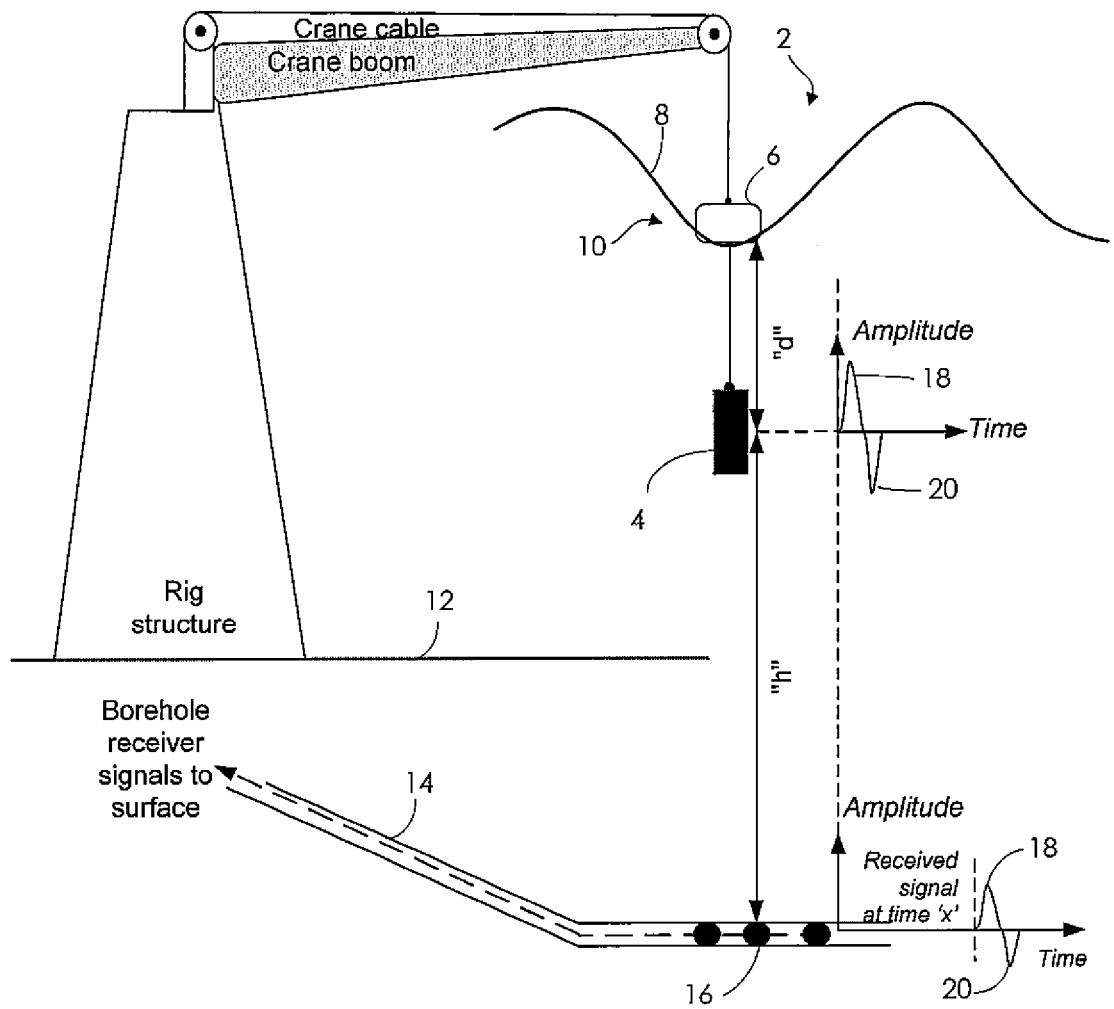
FIG. 1A is a simplified view of an offshore rig positioned over a borehole containing a plurality of receivers. The rig is shown supporting a seismic survey apparatus according to one embodiment of the present disclosure.

Throughout the drawings, identical reference numbers indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Some aspects contemplate methods and apparatus for use in vertical seismic profile (VSP) and other borehole seismic surveys. The principles described herein facilitate generation of more accurate seismic source information than previously possible, adding precision to seismic data to enable sophisticated seismic data processing. In particular, the present disclosure provides techniques for extending the low and high frequency content of source signature data by smoothing out or minimizing ghost notches in the frequency domain. For example, a typical source at a shallow depth of about 5 m provides a frequency content of about 20-150 Hz whereas a typical deep source having a depth of about 10 m provides frequency content in the range of about 10-75 Hz. The techniques proposed herein enhance the individual source signature of a shallow and a deep source so that combined source signature data has frequency content of about 5 Hz to about 250 HZ and, in some aspects herein, from about 10 Hz to about 200 Hz. In this, the present disclosure provides novel and useful solutions to prior difficulties in utilizing one source to cover deep and shallow reservoir layers.

Some methods and apparatus described herein may be implemented to correct or compensate for ghost signals, and/or provide for synchronization between source firing, downhole seismic receiver recording, and (optionally) surface seismic receiver recording. However, while the methods and apparatus are shown in marine implementations, they may also be used for land applications. As those skilled in the art would understand, it is possible to utilize the present techniques with seismic sources in a water filled pit on land and borehole receivers deployed in an adjacent body of sea water for purposes of seismic survey, or vice versa.

Figure 1B:
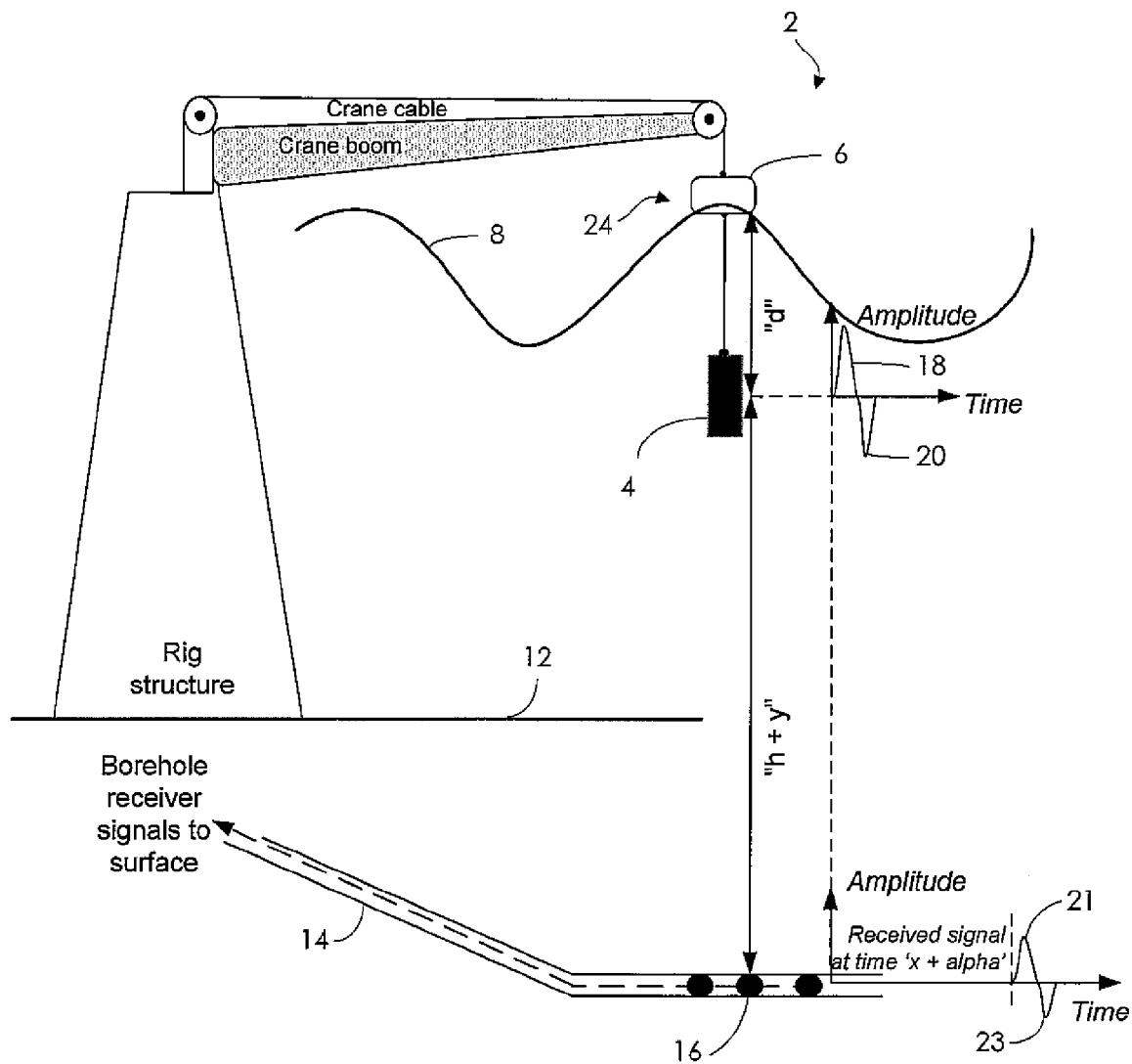
FIG. 1B is a simplified alternative view of the offshore rig positioned over a borehole containing a plurality of receivers as shown in FIG. 1A.

FIGS. 1A and 1B illustrate the problems described above with regard to smearing and transit time inaccuracies presented by marine seismic survey. Referring to FIG. 1A, in a seismic measure system (2) seismic energy is emitted from a seismic source (4) (e.g., an array of airguns) and detected by sensors (16) in a borehole (14) below the surface of a body of water. The source (4) imparts an acoustic wave to the water, creating a wavefield which travels coherently into the earth underlying the water. As the wavefield strikes interfaces (not shown) between earth formations, or strata, it is reflected back to the sensors (16), where it is converted to electrical signals and recorded.

In other marine survey methods, the sensors and/or sources are placed at or close to the seabed (12). Through analysis of these detected signals, it is possible to determine the shape, position and lithology of the sub-sea formations.

A problem encountered in marine VSP surveying is that of water column reverberation. The problem arises as a result of the inherent reflectivity of the water surface and bed (as well as sub-sea boundaries). A seismic wave reflected from seabed or sub-sea earth strata passes into the water in a generally upward direction. This wave, termed the "primary," travels past the seismic sensors, which record its presence (i.e., characteristics of the primary). The wavefield continues upwardly to the water's surface, where it is reflected back downwardly. This reflected, or "ghost," wavefield also travels through the water and past the sensor(s) where it is again recorded.

Depending upon the nature of the earth material at the water's bottom, the ghost wavefield may itself be reflected upwardly through the water, giving rise to a series of one or more subsequent ghost reflections or "multiples." In instances where the earth material at the seabed is particularly hard, excess acoustic energy or noise generated by the seismic source can also become trapped in the water column, reverberating in the same manner as the reflected seismic waves themselves. This noise is often high in amplitude and, as a result, tends to cover the weaker seismic reflection signals sought for study. This reverberation of the seismic wavefield in the water obscures seismic data, amplifying certain frequencies and attenuating others, thereby making it difficult to analyze the underlying earth formations. Deghosting, or removal of the ghost wavefield(s), is therefore important for accurate characterization of earth formations. Those skilled in the relevant art will appreciate that deghosting alone does not entirely solve the multiple problem (although other known methods address multiples), since every multiple will have an up-going part as well as a down-going part (its ghost).

A need therefore exists for a solution to these shortcomings associated with marine borehole seismic surveys.

In addition, some methods and apparatus provided herein facilitate better seismic data analysis by more accurately providing source signatures. More accurate source signatures are a result of a source control system described below which may, for example, vary seismic source firing to coincide with an absolute height for repeated shots or every shot in a marine application. Sea swells and tidal variations can introduce noise to seismic data and render it difficult or impossible to estimate the source signature. For example, sea swells of 3 m can lead to a 2 ms time displacement due to the potential differences in vertical displacement of a buoyed source. Larger swells can have an even more significant effect. For example, when shots are stacked during a rig-side VSP or an offset VSP, the change in transit time for each shot results in smearing of the seismic signals received during stacking and a loss of high frequencies. In fact, because of the noise that can be created by rough seas, marine surveys have previously been limited to conditions when sea swells are something less than approximately 3 to 4 m. Similarly, sea swells, tidal variations, and other phenomena can have an effect on transit time accuracy.

Without the compensation methods and apparatus taught herein, seismic signals received during stacking may be smeared, and transit time measurements may be inaccurate.

As shown in FIG. 1A, a seismic measure system (2) may include a seismic source (4) suspended below a float (6) at a distance "d" from a sea surface (8). The distance "d" between the float (6) and the seismic source (4) remains constant, but the absolute height of both the float (6) and therefore the seismic source (4) change with the height of the sea surface (8). "Absolute" height means a height measurement that is independent of arbitrary standards. Absolute height may be measured, for example from a same, fixed reference point such as the center of the earth. Therefore, the absolute height of the seismic source (4) suspended from a float (6) on the sea surface (8) changes as the sea surface rises and falls. However, the positions of a sea floor (12), a borehole (14), and receivers (16) in the borehole (14) are fixed and absolute and do not change with variations of the sea surface (8).

FIG. 1A illustrates the float (6) in a trough (10) of the sea surface (8). The seismic source (4) suspended from the float (6) is at a height "h" above the receivers (16) in the borehole when the float (6) is in the trough (10). If the seismic source (4) is fired at time zero (0), a source signal (18) and source ghost signal (20) are generated. The source signal (18) and source ghost signal (20) are received by the receiver (16) at time "x". Time "x" is based on the speed of sound in the sea and the distance "h."

FIG. 1B illustrates the float (6) at a different time such that the float (6) is located at a peak (24) of the varying sea surface (8). The seismic source (4) is still suspended from the float, and the distance between the float (6) and the seismic source (4) remains "d." However, the seismic source (4) is now at a height "h+y" above the receivers (16). The additional "y" distance is a measure of the change in sea surface height (8) due, for example, to waves (but could also be due to variations in tide). If the seismic source (4) is fired at time zero (0) again, the source signal (18) and the source ghost signal (20) are received by the receiver (16) at time "x+alpha." It takes "alpha" time longer for the seismic source signal (21) and the source ghost signal (23) to travel through the additional distance "y" of water. Thus, transit times can vary due to changes in the sea surface (8) conditions and lead to smearing and inaccurate results.

According to some principles described herein, controllers repeatedly fire seismic sources at a same absolute height (for example at height "h" of the seismic source(s) (4) above the receivers (16)) so that transit times are based on signals traveling the same distance. In some embodiments, controllers fire seismic sources only at the same absolute height of the seismic source(s).

Figure 2A:
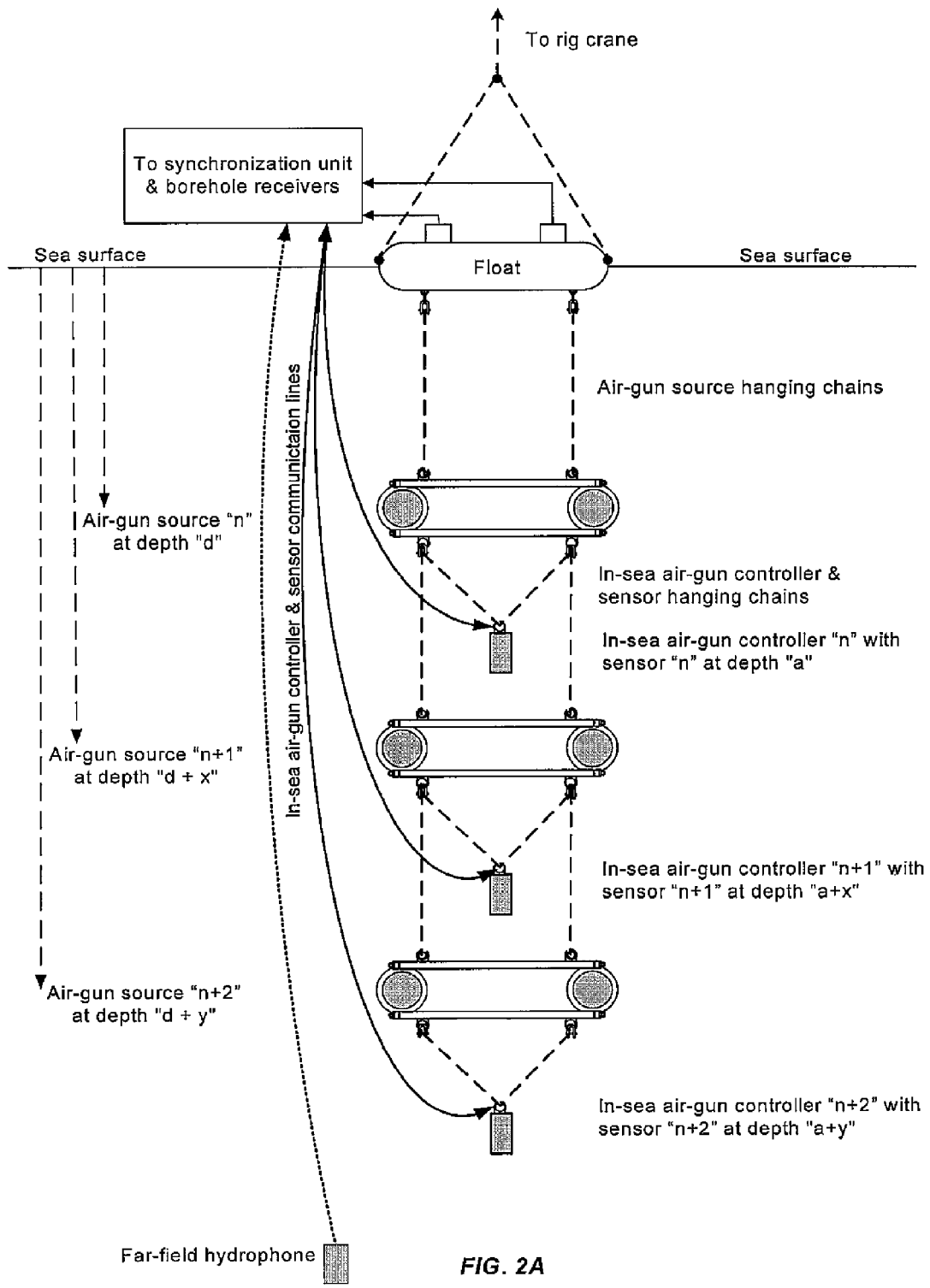
FIG. 2A is a schematic depiction of the configuration of an in-sea seismic survey system for a seismic apparatus for borehole seismic surveying according to one embodiment of the present disclosure.

Referring to FIG. 2A, a seismic system, such as a seismic survey system schematically illustrated in FIG. 2A, may stand alone or be part of a survey apparatus such as the survey apparatus described below with reference to FIG. 4. The seismic survey system of FIG. 2A may replace some or all of the subsea components described below with reference to FIG. 4.

FIG. 2A discloses an exemplary in-sea seismic source configuration in which, for example, three seismic sources, such as airguns or airgun clusters, are arranged vertically one above the other. For example, the shallowest source "n" may be disposed at "d" meters depth and the deepest source "n+2" at "d+y" meters depth with an intervening source "n+1" at "d+x" meters depth. As depicted in FIG. 2A, in-sea airgun controllers and seismic sensors may be associated with each seismic source. The shallowest source "n" is fired and the seismic record measured using seismic sensors located at depths inside the earth (note FIGS. 1A and 1B). The present disclosure contemplates seismic sensors with a VSP receiver string, a seismic while drilling system, permanently deployed sensors, etc. The second, deeper source "n+1" is then fired and its seismic signal is recorded too.

As depicted in FIG. 2A, a far field hydrophone may be deployed at a suitable distance spaced away from the sources "n", "n+1", and "n+2" such that advancing pressure waves from the sources may be recorded by the hydrophone in the far field. The signals recorded at the far field hydrophone would be representative of the seismic signals that enter the sea bed. Such data may be utilized to further fine tune the seismic sources. Furthermore, the data recorded at the far field hydrophone may be utilized during downstream processing of the recorded seismic signals at, for example, a data center.

Figure 2B:
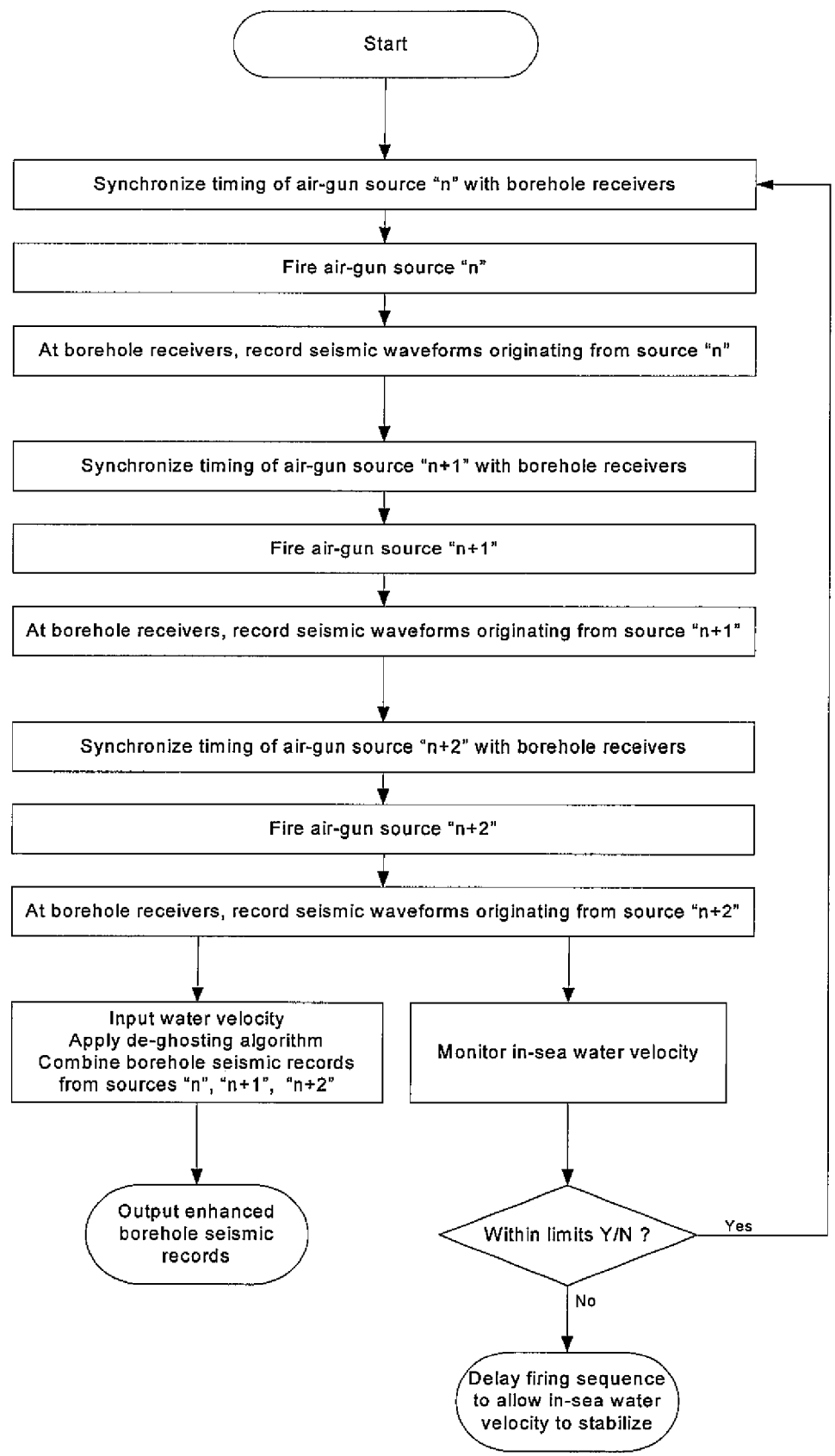
FIG. 2B is a flowchart depicting techniques for borehole seismic surveying according to some embodiments of the present disclosure.
Figure 2C:
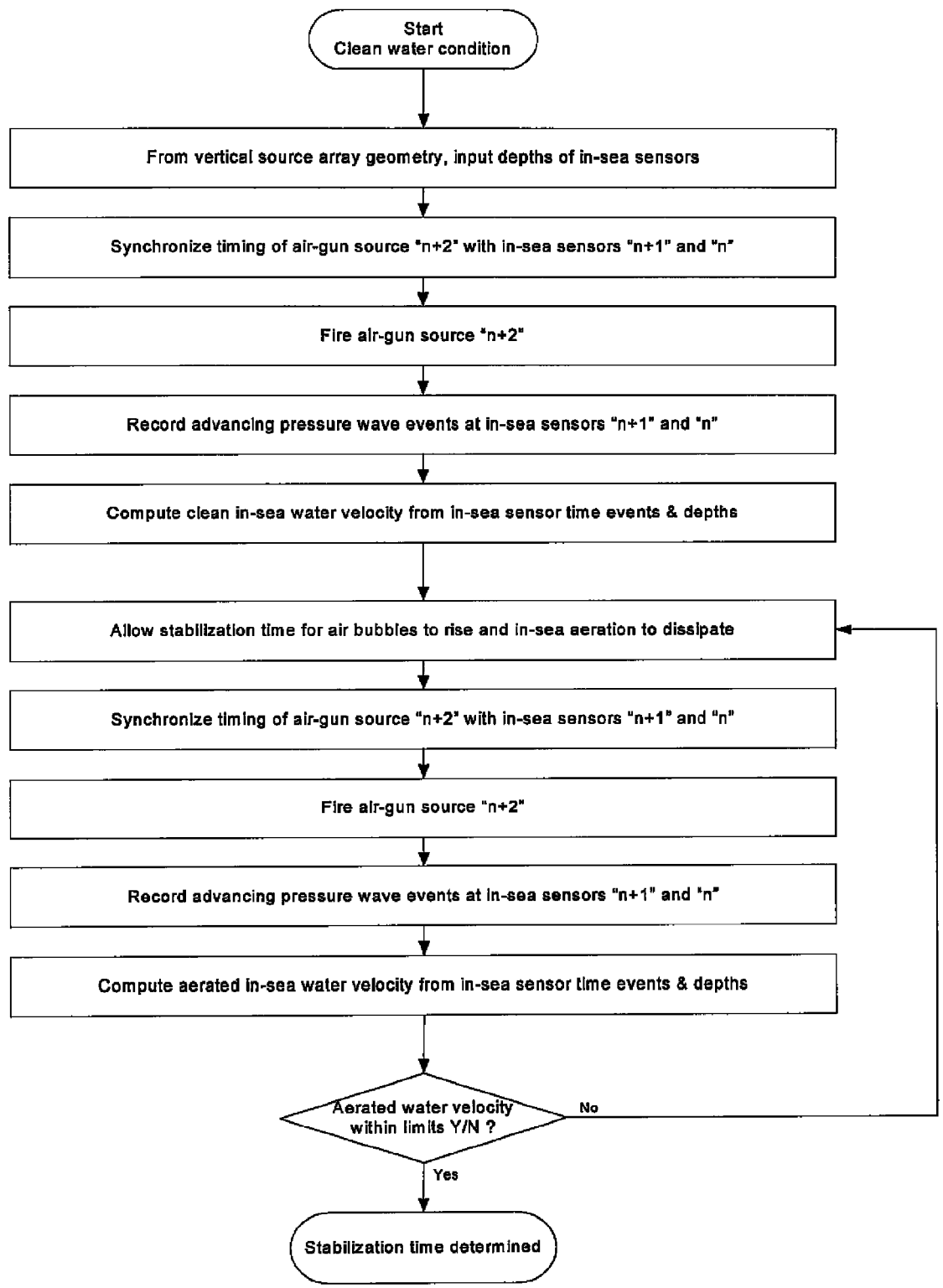
FIG. 2C is a flowchart depicting additional techniques for borehole seismic surveying according to further embodiments of the present disclosure.

FIGS. 2B and 2C depict techniques for borehole seismic surveying according to some embodiments of the present disclosure. As shown in FIG. 2B, firing of the seismic sources "n", "n+1" and "n+2" is synchronized with recording of seismic signals by borehole receivers. The seismic records from sources "n", "n+1" and "n+2" are then combined using an over/under deghosting algorithm, such as shift and sum or the Postumus method. The resulting combined seismogram will have the ghost part of the source signature attenuated and the frequency content of the seismogram enriched at both the low and high frequencies.

As also depicted in FIG. 2B, the seismic records from sources "n", "n+1" and "n+2" may be utilized to monitor the velocity of the pressure wave through water. FIG. 2C is a flowchart depiction of one technique for determining the water velocity of the pressure wave according to the present disclosure. The present inventors recognized that aeration in water caused by the firing of in-sea airguns causes changes in the water velocity of sound. As a consequence of aerated water, the quality of recorded seismic signals is diminished causing smearing in the signals. It is noted that the technique depicted in FIG. 2C for determining water velocity of pressure waves is exemplary. In this, those skilled in the art will appreciate that more than one way may be utilized to measure the in-sea water velocity.

FIG. 2C depicts calculating the degradation of water velocity due to aeration from the bottom up, i.e., from the deepest to the shallowest. As the air bubbles rise, the aeration will continue to degrade the water velocity around the shallower sources, while the water velocity around the deeper sources will stabilize first. Hence, the firing of the shallower source(s) may be delayed until the water velocity is within predetermined or appropriate limits.

FIG. 2C also depicts determining the stabilization time that is required to maintain the water velocity within a predetermined desirable range, i.e., the time that is needed for the air bubbles in the water to dissipate sufficiently so that water velocity is not degraded beyond acceptable limits. The determined stabilization time may be utilized for controlling the firing times and sequences of the seismic sources so as to maintain water velocity within acceptable limits.

Figure 3A:
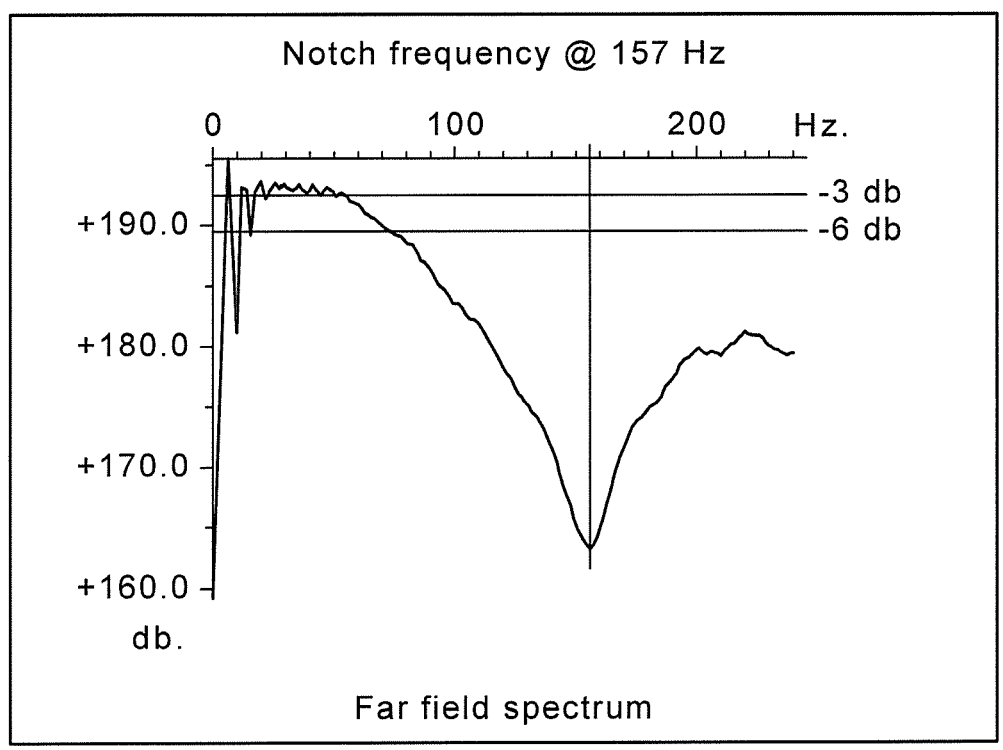
FIGS. 3A-3C are graphical depictions of modeled source signature data in the frequency domain according to principles of the present disclosure.
Figure 3B:
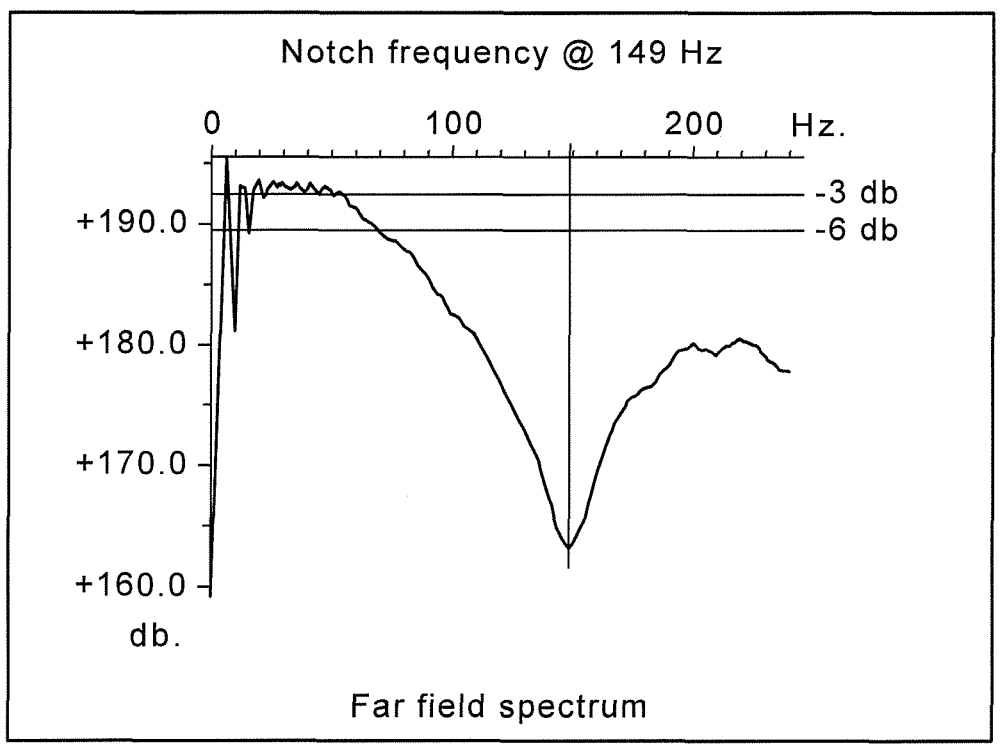
Figure 3C:
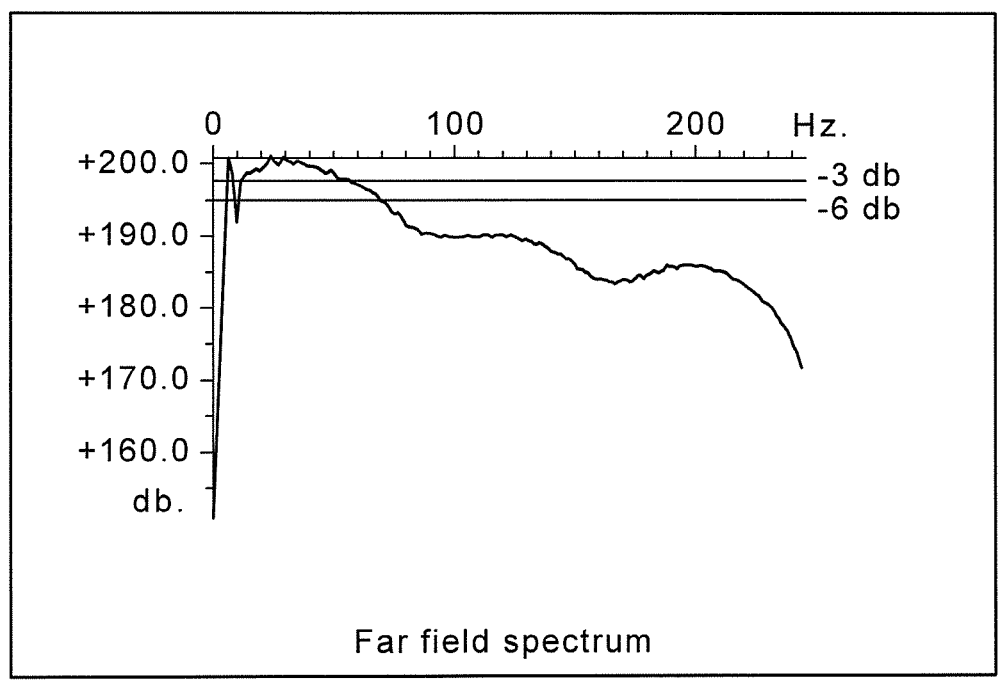

The present inventors also recognized that utilizing the techniques presented herein with a plurality of sources at different depths would improve the quality of the resulting VSP seismic data. FIGS. 3A-3C are graphical depictions of modeled source signature data in the frequency domain according to principles of the present disclosure. In FIGS. 3A and 313, modeling is provided for three airguns mounted as a cluster in a triangular frame that is submerged in water at a depth of 5 m. The modeling in FIG. 3A assumes the water velocity to be 1496 m/sec whereas the modeling in FIG. 3B assumes the water velocity to be 1425 m/sec. As evident from a comparison of FIGS. 3A and 313 there is a shift in the notch frequency between the two modeled examples. Although the change in water velocity for the modeled data is small, more severe changes in water velocity, for example, from 1496 m/sec to 1300 m/s, would further increase the shift in the notch frequency.

FIG. 3C depicts modeling with multiple airgun sources at depths of 3 m, 6 m, and 9 m. The seismic source signature in FIG. 3C has smoother, extended frequency bandwidth. It is noted that the techniques described herein are not restricted to airguns, but can be applied to any seismic source, such as marine vibrators, waterguns, among others that are known in the art. Moreover, the present disclosure also contemplates configurations of 4, 5, 6, or more vertically spaced airguns or airgun clusters deployed in water at different depths as desirable or necessary for the purposes described herein. Those of ordinary skill in the art having the benefit of the present disclosure would recognize that it is possible to identify or select the appropriate configuration(s) and deployment schemes for the seismic source(s) using modeling techniques that are well known in the art of seismic survey.

As also described above in connection with FIG. 2A, the over/under techniques described herein can be extended to more than two sources. For example:

First source "n" is deployed at depth "d" with seismic record "n" taken.

Second source "n+1" is deployed at depth "d+x" with seismic record "n+1" taken.

Third source "n+2" is deployed at depth "d+y" with seismic record "n+2" taken and so on.

The "n+2" (and so on) individual seismic records are then combined using an over/under algorithm, such as shift and sum or the Postumus method.

The usual practice in VSP data acquisition is to record a number of shots for each receiver tool depth deployment, and these individual shot records are summed to improve the signal-to-noise ratio of the resulting data. The same practice may be applied to the over/under techniques described here. It would be advantageous, but not necessary, for multiple shots to be fired consecutively for the shallowest source first, then for the deepest source. This would minimize the affects of aerated water on the quality of the signatures recorded in the seismic data.

The aforementioned techniques may be an alternative to a method of airgun sources spaced in a vertical array as further described hereinafter (note FIG. 8), where each source is fired in turn, with a short delay between each to continuously align and substantially maximize the amplitude of the downgoing pressure wave in a single shot record.

Figure 4:
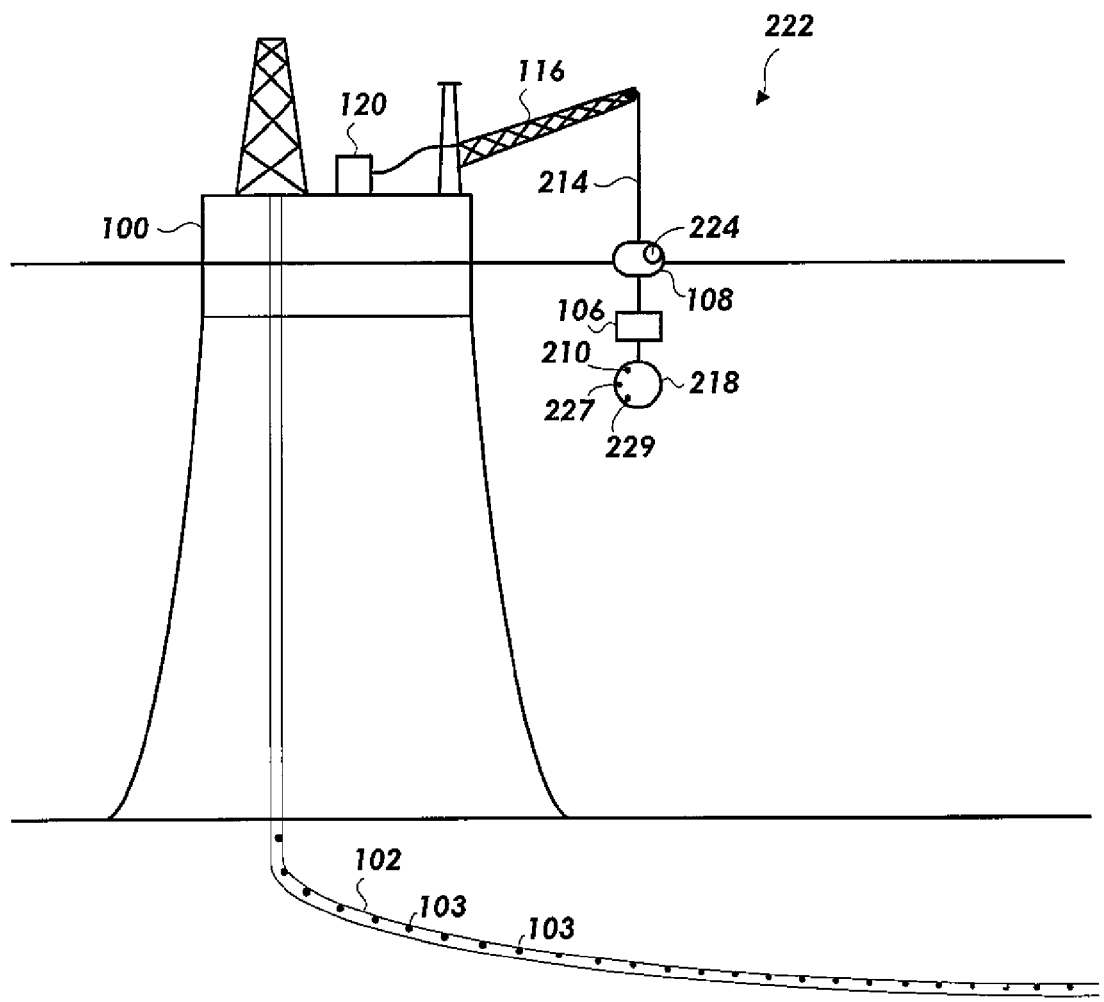
FIG. 4 is a simplified view of an offshore rig positioned over a borehole containing a plurality of receivers. The rig is shown supporting a seismic survey apparatus with a source control system according to one aspect of the present disclosure.

A source control system according to one aspect of the present disclosure illustrated in FIG. 4 facilitates much more accurate seismic data. According to the arrangement of FIG. 4, there is an offshore rig (100) positioned over a subsea borehole (102) containing a plurality of receivers (103). The rig (100) is shown supporting a source control system and designated generally as (222). The rig (100) may be replaced, according to some embodiments, with a movable vessel. The source control system (222) includes a seismic source, a handling system, an umbilical (214), and an in-sea source controller (218) for controlling the firing of the seismic source. The source control system (222) and the borehole receivers (103) may be integrated to provide a borehole survey system.

According to the embodiment of FIG. 4 the seismic source is the airgun (106), which may be a single gun, an array of guns, or any other arrangement. The handling system includes a crane (116) and associated apparatus to facilitate the deployment and retrieval of the source control system (222) and airgun (106). The umbilical (214) includes an air supply, which is operatively connected to a compressor. The compressor is preferably located on the rig (100). However, unlike the typical survey apparatus with long analog communication lines, the umbilical (214) of the source control system (222) according to FIG. 4 includes only digital communication lines between the in-sea source controller (218) and the processor (120) on the rig (100). The use of digital lines eliminates any crosstalk, signal leakage, and the potential for an inadvertent gun firing upon removal of the communication links. As mentioned above, the airgun (106) is controlled by the in-sea controller (218) and generates seismic waves that are received by the borehole receivers (103) to generate, for example, a VSP survey.

The source control system (222) may also include an attached float (108) to buoy the airgun (106), the in-sea controller (218), and any other in-sea apparatus. The float (108) may advantageously include a navigational system or motion sensor, such as a Global Positioning System (224) (GPS). GPS systems are readily available from a variety of sources. The GPS system (224), among other things, facilitates detection of changes in absolute height (due, for example, to waves or changes in tide). As mentioned above with reference to FIGS. 1A and 1B, firing the airguns (4) at different absolute heights or different heights with respect to borehole sensors can adversely affect the determination of the source signature of the airgun (106) and/or other data (e.g. transit times) collected by the borehole receivers (103). Accordingly, the GPS system (224) feeds position information to the processor (120) and/or the in-sea source controller (218) so that the airgun (106) may be fired repeatedly at and/or only at certain absolute heights. The firing of the airgun (106) at certain absolute heights may be controlled by a switch or other mechanism associated with the GPS system (224) or the in-sea controller (218), such that the airgun is automatically fired at an absolute height (e.g. a fixed height relative to receivers in a borehole or a fixed height above the center of the earth). Conventional marine surveys fire airguns at regular time intervals, regardless of absolute height. The addition of a motion sensor according to principles described herein increases the accuracy of the source signature determination, discussed in more detail below.

In addition to providing position information, the GPS system (224) may also receive and broadcast a time standard to the in-sea controller (218), the processor (120), and/or any navigation subsystems that may be used with source control system (222). This time standard may, for example, be Universal Time Coordinated (UTC). The UTC time standard may be supplied to various survey subsystems to synchronize the firing of the airguns (106) with the recording of data by the borehole receivers (103). According to some embodiments, there may also be surface receivers, the recording of which may also be synchronized with airgun (106) firing using the time standard provided by the GPS system (224).

Further, according to some embodiments, the in-sea source controller (218) may include one or more in-sea sensors providing signals to enable, among other things, source signature estimation. Preferably, the in-sea sensors are located at the in-sea source controller (218) and maintain a fixed geometry relative to the airgun (106) or other seismic source. The one or more in-sea sensors may include, but are not limited to: a calibrated digital hydrophone (210), a depth sensor (227), and an air pressure sensor (229). The one or more in-sea sensors may also include short analog communication lines to the in-sea source controller (218), where the signals may be digitized at the source for relay to the processor (120). Therefore, according to the embodiment of FIG. 4, if the source control system (222) includes analog lines, those lines are relatively short, instead of the very long analog lines found in previous survey systems that extend all the way from the seismic source to the rig. The hydrophone (210) according to the present disclosure provides improved fidelity of a near field signal because it is calibrated in-sea and digitized at the seismic source. In addition, the air pressure sensor (229) monitors air pressure supply at the airgun source and reports firing pressure variations which can be taken into account when determining the source signature. Accordingly, the seismic source signature may be more accurately estimated by accounting for timing variations, hydrodynamic variations, pressure supply variations, etc., using the calibrated digital hydrophone (210) signal and air pressure readings at the seismic source.

Estimation of an accurate source signal is highly important to VSP processing. The source signal enables separation of the upgoing and downgoing wavefields. Inconsistent source signatures result in residuals in collected data by the multi-channel velocity filters used to separate wavefields. These residuals are effectively "noise" and can cause significant distortion to the processed results. With an ever-increasing focus on true amplitude and time-lapse borehole seismic measurements, source signature consistency is very important to VSP surveys. Good source signature estimation using the methods and apparatus taught herein increases the consistency of the source signature. Likewise, inaccurate or smeared transit times as described above can be reduced or eliminated by adhering to the principles described herein.

Calibrating the source signatures has in the past been accomplished by visual quality checks. These visual checks include, for example, looking for airguns that did not fire and ensuring the frequency response covers both low and high ends. Such checks are somewhat subjective, however, and even more so if the airgun (106) reference far field source signature is unknown. According to the present embodiment having the in-sea source controller (218), however, the airgun (106) source reference far field signatures may be maintained on file at the well site, so the source control system (222) can be programmed to automatically check the measured source signature against the reference source signature. By performing an automatic check, there is an assurance that for each well site setup the airgun (106) source signature meets its performance acceptance criteria. Calibrated and consistent source signatures are important for evaluating the subsurface changes in time-lapse surveys. With a calibrated source signature, variations in seismic reflections will be representative of subsurface changes, instead of changes in the source signature.

Seismic sources signatures for VSP must be surface referenced, and if there is a change in datum level (e.g. as the airgun (106) rises and falls in a rough sea), there will be small 1 or 2 ms time shifts. However, the changes in datum level may be eliminated or compensated for by using the GPS system (224) or other motion sensing equipment. Further, heretofore tidal corrections have not been made for borehole seismic measurements. While failing to make tidal corrections may be acceptable for deep-water surveys, depending on the time of day and the strength of the tide, there may be a significant affect on transit times in coastal areas. Therefore, according to some embodiments the source control system (222) includes an absolute height or depth sensor (227) to monitor the absolute height of the airgun (106) (which is below the water surface). The height or depth sensor (227) may be, for example, a commercially available bathymetry sensor. Variations in tide may then also be accounted for according to principles described herein. In addition, the airgun (106) may be automatically disabled if the height or depth sensor (227) reports a depth less than a predetermined level. The attributes reported by the in-sea sensors may be automatically displayed at the processor (120) for a user to see.

In one embodiment, the configuration of the airgun (106) may be an array or cluster arrangement, such as a three-gun cluster. However, any other airgun arrangement may also be used. For example, some embodiments may include vertical airgun arrays of up to eight guns or more. Prior methods are restricted to simultaneous firing of airguns. The digital in-sea controller (218) in the present disclosure provides the capability to stagger the firing of an array of airguns (106), which has previously been unavailable using rig-based analog controllers that lack the tuning flexibility to fire sequentially.

Figure 5:
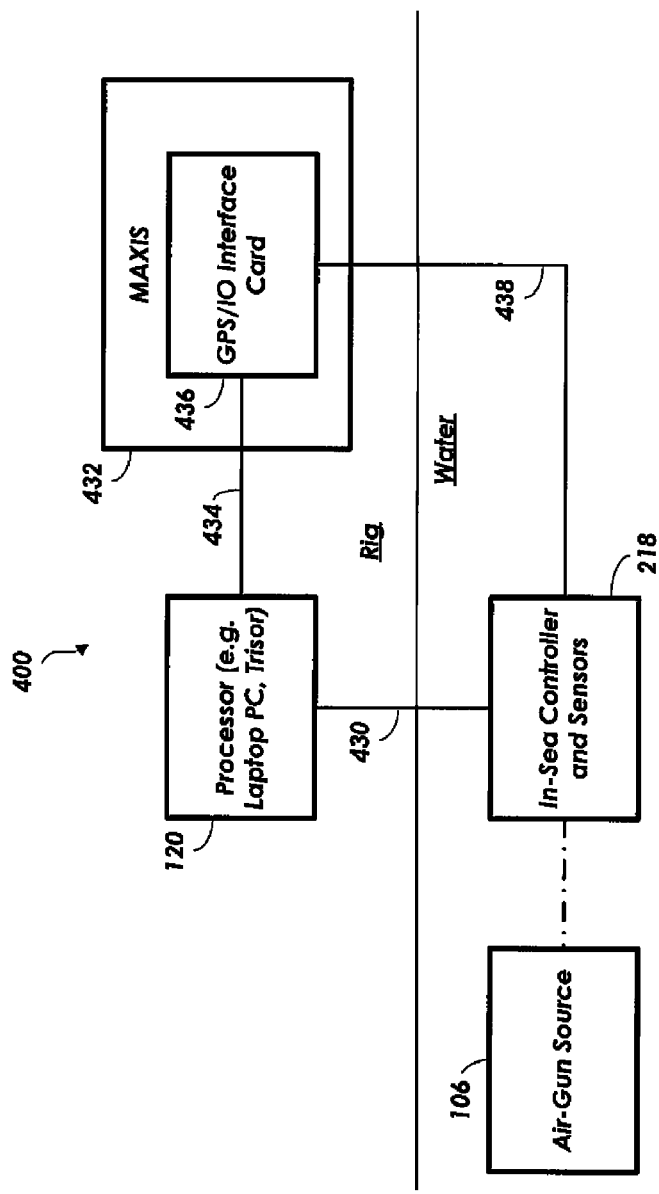
FIG. 5 is a schematic diagram illustrating a source control system according to one aspect of the present disclosure.

Referring next to FIG. 5, a schematic illustration of one possible source control system (400) configuration according to aspects of the present disclosure is shown. As shown in FIG. 5, the processor (120) may be a laptop computer running a digital source control program. The processor (120) may control and/or monitor the in-sea controller and sensors (218) described above with reference to FIG. 4, which may also include the GPS system (224, FIG. 4). The communication interface between the processor (120) and the in-sea controller (218) and sensors (227, 229) is preferably a digital link (430). This digital link (430) may be used for pre-testing the system in preparation for data acquisition. The processor (120) may also link with an acquisition and imaging system (432), for example Schlumberger's MAXIS™ (Multitask Acquisition and Imaging System) system via another digital interface (434). The acquisition and imaging system (432) may include a GPS digital data interface (436) as shown. Alternatively, the processor (120) may contain a GPS digital data interface (436). The processor (120) and acquisition and imaging system (432) are located on the rig according to the illustration of FIG. 5, however, as the name suggests, the in-sea controller and sensors (218) are located in the water adjacent the airgun (106) or other seismic source. The in-sea controller and sensors (218) may also have a digital interface (438) with the acquisition and imaging system (432). This direct digital interface (438) may provide the primary interface with the acquisition and imaging system (432) during data acquisition. The only analog interface (440) of the source control system (400) extends the short distance between the in-sea controller and sensors (218) and the airgun source (106).

Figure 6:
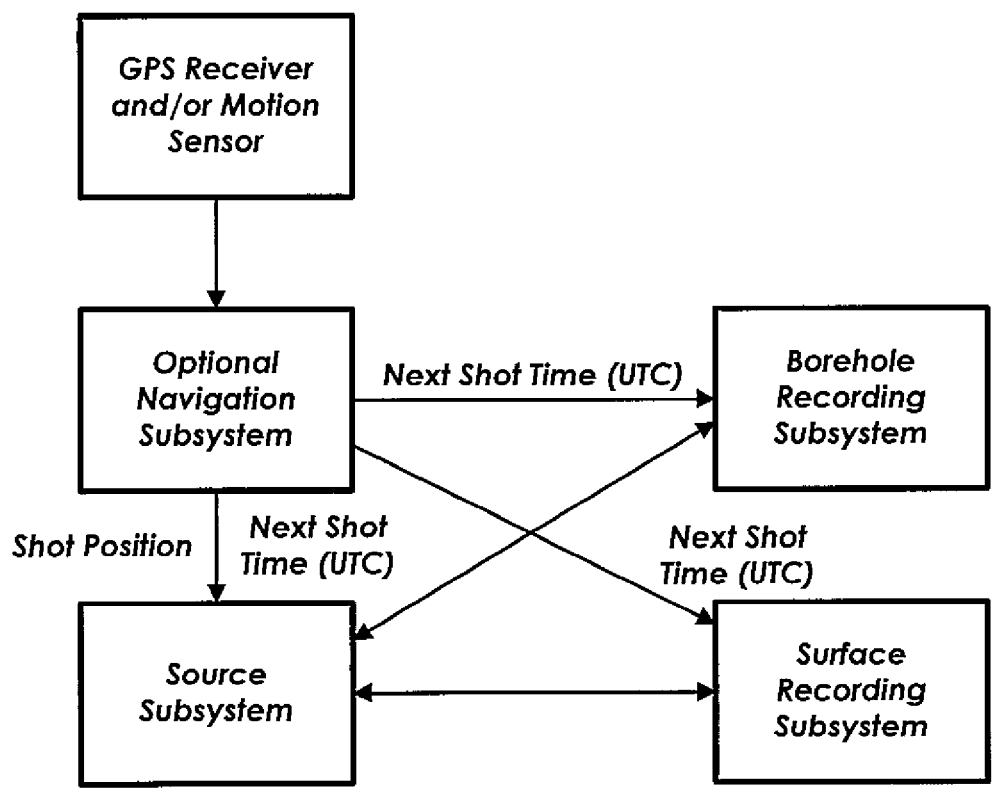
FIG. 6 is a schematic illustration of a source control method according to one aspect of the present disclosure.
Figure 7:
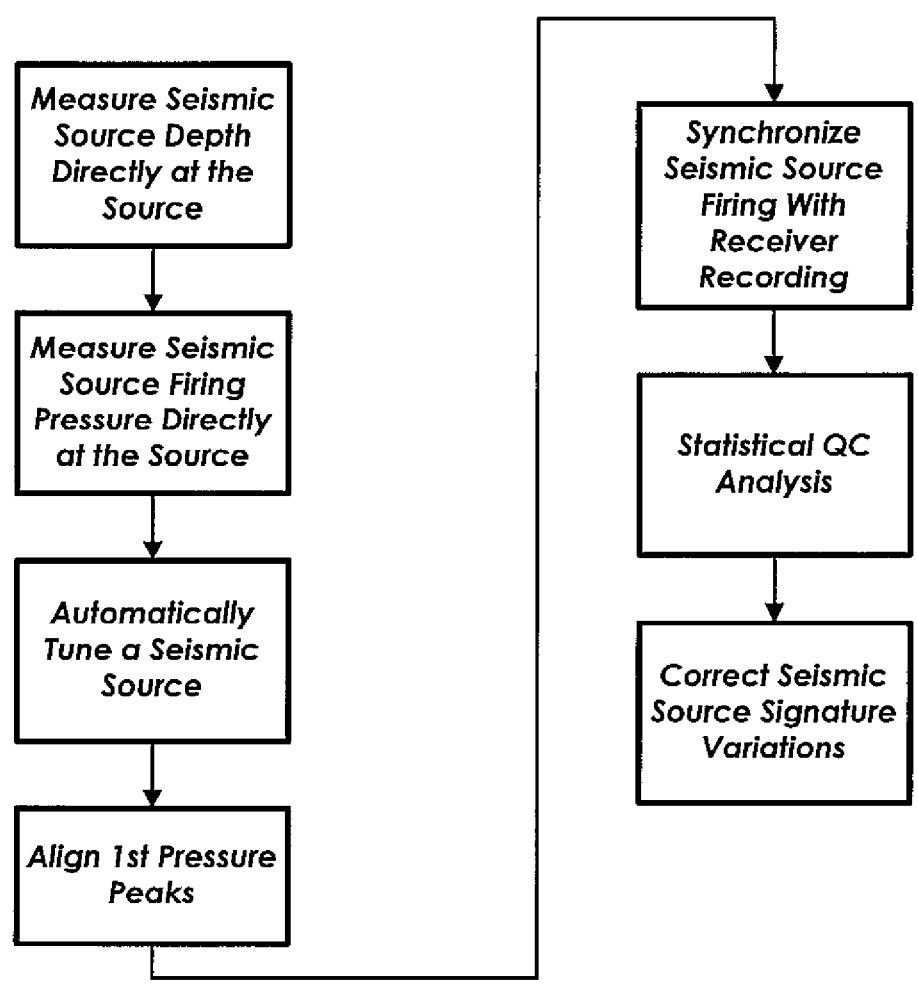
FIG. 7 is a schematic illustration of a source control method according to another aspect of the present disclosure.

Turning next to FIGS. 6 and 7 schematic illustrations representing methods of using the source control system (222) and/or improving a VSP survey are shown. It will be understood, however, that the methods shown and described are not limited to the particular sequences shown, nor must all the steps described be performed. The steps described may be accomplished in any of a number of sequences. According to one method, a seismic source such as an airgun cluster (FIG. 4) is automatically tuned, for example, by the in-sea source controller (218). The in-sea source controller (218) may keep individual airguns (106, FIGS. 4 and 5) firing in synchronization with one another by aligning first pressure peaks detected by the hydrophone (210, FIG. 4) located adjacent the airguns (106, FIGS. 4 and 5). "First" can, but does not necessarily mean, the pressure peak that arrives first in time. "First" may also mean "one" or "a."

Furthermore, as previously described above, data recorded by a far field hydrophone (note FIG. 2A) may be used to fine tune the source signatures. Therefore, according to some embodiments, the in-sea source controller (218) may tune or synchronize individual airguns (106) with one another by aligning the pressure peaks, by aligning low frequency bubble peaks, or by other methods.

Some attempts to reduce the problems with ghosting have focused on programming a fixed delay between the firing of each airgun. Nevertheless, salinity, temperature, depth, bubbles, and other phenomena significantly affect the velocity of a pressure wave through water. Air bubbles generated by the firing of the airguns may have profound affect on the velocity of pressure waves through the water. Accordingly, even a fixed firing delay may result in ghosting (a notch frequency) and inaccurate seismic measurements. Therefore, in some embodiments, each seismic source, such as an airgun, is fired sequentially or staggered to substantially maximize the amplitude of the pressure wave. As previously discussed, predetermined parameters may be established, such as stabilization time, range of acceptable water velocity, etc., to maximize amplitude yields of the seismic signals. Substantially maximizing the amplitude yields, among other things, increased bandwidth, a reduction of high-frequency notches and enhancement of low frequencies, reduced susceptibility to rough sea reflections, and a more omni-directional source pattern.

In some embodiments, the sequential or staggered firing is active or dynamic. The advancing pressure wave is measured for each firing, allowing the firing of each airgun in a staggered array to be adjusted in time to continually align and substantially maximize the amplitude of the downgoing pressure wave.

In other embodiments, the advancing pressure wave is measured for each firing to determine a water velocity of the sea water. In this, the firing of each air gun in a staggered array may be adjusted in time so that subsequent firing are at a predetermined water velocity.

In one embodiment, airguns are spaced vertically and fired with dynamic time delays to align and/or maximize the amplitude of the downgoing pressure wave while also minimizing sea surface reflection. A staggered airgun array's advancing pressure wave may be measured by an in-sea sensor at each airgun (except for the first airgun, which would not need a time adjustment if it fires first in time, but could have a sensor for other reasons), allowing firing of the next deeper airgun in the airgun array to be adjusted in time to continually substantially maximize the amplitude by superimposition of the pressure waves. In one embodiment, as each airgun in the staggered array is positioned at a corresponding deeper location from a sea surface, the advancing wave continues to be measured and each airgun is fired based on the feedback from sensors detecting the advancing wave. Adjusting the firing of each deeper airgun reduces the ghosting effects related to vertical airgun deployments. Moreover, a synchronization unit may use the in-sea sensor measurements of the downgoing pressure wave to synchronize the staggered array firing with the recording of receivers in the borehole.

Figure 8:
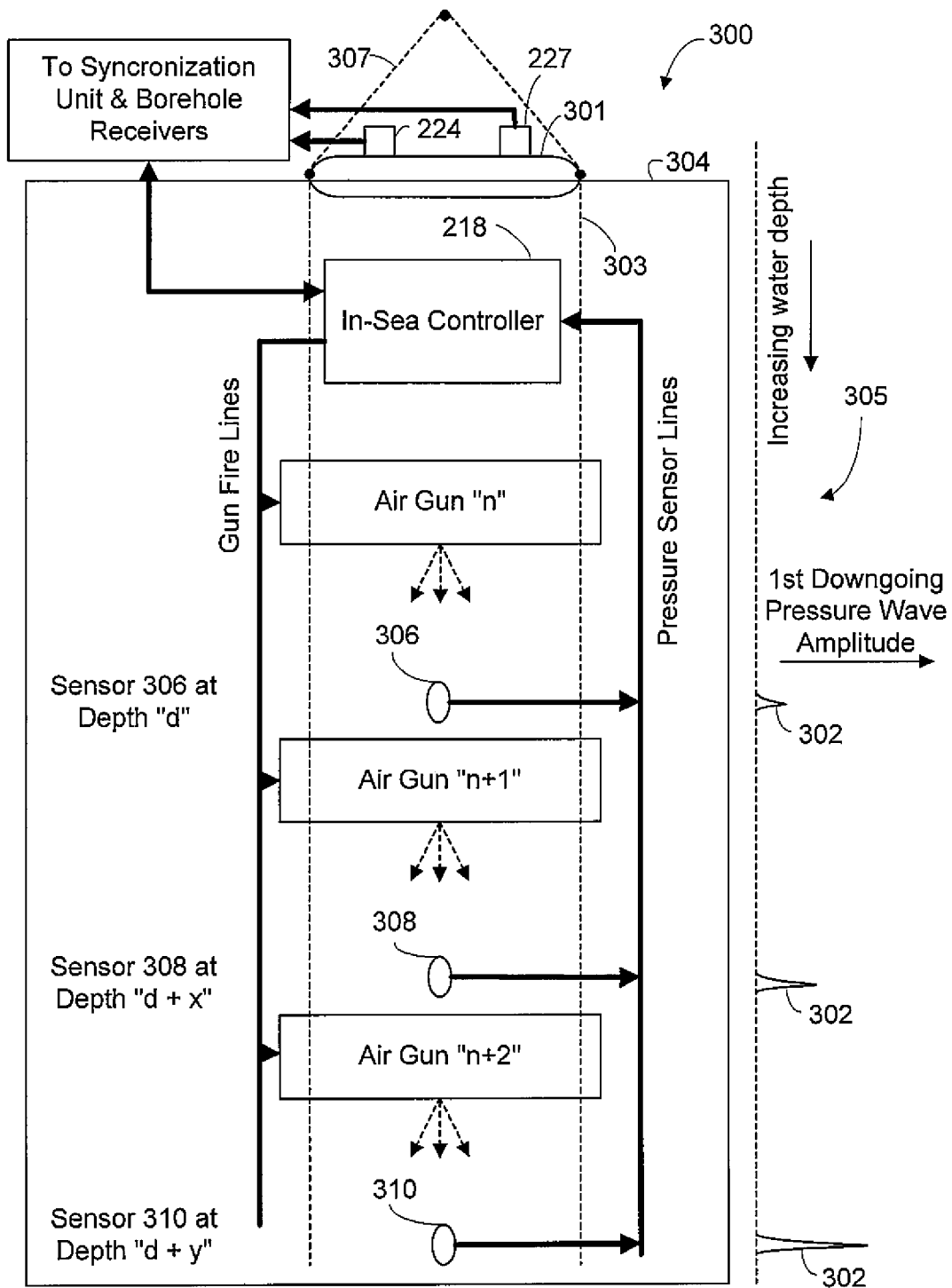
FIG. 8 is a schematic illustration of one seismic survey system and method according to one aspect of the present disclosure.

Referring to FIG. 8, a seismic system such as a seismic survey system (300) may stand alone or be part of a survey apparatus such as the survey apparatus described above with reference to FIG. 4. The seismic survey system (300) of FIG. 8 may replace some or all of the subsea components described above with reference to FIG. 4.

A similar seismic survey system is depicted in FIG. 2A. The following description will also apply, as appropriate, to FIG. 2A. The seismic survey system (300) may comprise a first seismic source such as a first air gun (n) that is closest to a sea surface (304). The seismic survey system (300) may also comprise an array (305) of seismic sources or airguns and therefore include at least a second airgun (n+1) spaced vertically from the first airgun (n). The array (305) may include any number of seismic sources, including the three shown in FIG. 8 (note also FIG. 2A). In one embodiment, a first seismic sensor such as a first hydrophone (306) may be located at the second airgun (n+1). In addition, in one embodiment, a controller, such as the in-sea controller (218), is operatively connected to the first and second airguns (n, n+1) and the first hydrophone (306). The in-sea controller (218) may be replaced by a controller that is not underwater. The airguns (n, n+1, etc.) may be suspended from a float (301) via hanging chains (303). The float (301) may also be attached to lifting chains (307), which enable deployment and retrieval of the float (301), in-sea controller (218), and airgun array (n, n+1, etc.). One or more sensors may be disposed on the float (301), such as the GPS system (224) and the motion or bathymetry sensor (227).

The in-sea controller (218) manages the firing times of each of the airguns (n, n+1, etc.) and receives feedback from the first hydrophone (306) (and, in some embodiments, additional hydrophones or other sensors). When the in-sea controller (218) fires the first airgun (n), it generates an advancing pressure wave (302). The first hydrophone (306) measures the advancing pressure wave (302) and communicates advancing pressure wave data to the in-sea controller (218). The in-sea controller monitors the advancing pressure wave data and staggers the timing of the firing of the next airgun (n+1) based on the feedback from the first hydrophone (306). Thus, the in-sea controller (218) may fire the second airgun (n+1) to align and/or substantially maximize the amplitude of the downgoing pressure waves by superimposition. For example, in some embodiments the in-sea controller (218) fires or is programmed to fire the second (n+1) and subsequent airguns (n+2, etc.) to align a first pressure peak of each seismic source. This routine may continue and be repeated for any number of additional airguns, each of which may have an associated hydrophone. However, the hydrophones can be spaced independently of the airguns as well and still report useful information to the in-sea controller for delayed firing of subsequent airguns.

FIG. 8 illustrates a third airgun (n+2) and an associated second hydrophone (308) and a third hydrophone (310) that may be associated with an additional (not shown) airgun. The airguns may be arranged deeper and deeper at constant or varying spacing. Because the in-sea controller (218) dynamically adjusts firing times of each airgun based on feedback from seismic sensors, the spacing between airguns does not have to be constant, and changes in water velocity due to bubbles (especially as airguns are fired), salinity, temperature, or other factors are accounted for because each airgun (after the first (n)) is fired based on feedback or data from the actual advancing wave as a result of the last airgun(s) firing.

In one embodiment, a synchronization unit such as the GPS system (224, FIG. 4) may receive feedback from the in-sea controller (218) near the surface (304) to synchronize the staggered array (305) firing with the recording of the receivers (103, FIG. 4) in the borehole (102, FIG. 4). In one embodiment, the borehole receivers (103, FIG. 4) comprise Geophone Accelerometer (GAC) sensors from Schlumberger Technology Corporation, where the measured sensor response is flat to 3 Hz. Other receivers may also be used.

In one embodiment, airgun chamber volume for each individual airgun (n, n+1, n+2, etc.) is adjusted from one airgun to the next. Airgun chamber volume may be selected to compensate for variations in source signature output caused by increasing water pressure with depth. One of ordinary skill in the art having the benefit of this disclosure may select and change airgun chamber volume based on depth to optimize source signals.

The principles described herein may have application to all borehole seismic surveys and other applications as well. The principles described herein provide high quality, consistent source signatures, even under varying sea surface conditions. Deep water or deep well exploration may benefit from the principles described herein. Using conventional apparatus and techniques, the seismic source signature can be compromised by the effects of attenuation and earth filtering. However, the principles and apparatus taught herein may overcome some of the weaknesses associated with conventional apparatus. Moreover, the principles described herein may have application to amplitude versus offset (AVO) analysis, where consistency of measured source signal is critical. The principles may also be useful for inversions and look-ahead analysis (prediction ahead of the borehole depth), where strong low frequency signature may be essential to the interpretation.

Some methods of using the source control system (222, FIG. 4) or improving a VSP survey may further include measuring the airgun (106 in FIG. 4; n, n+1, etc. in FIG. 8) pressure directly at the source. The measurement of airgun (106 in FIG. 4; n, n+1, etc. in FIG. 8) pressure may be facilitated, for example, by the pressure sensor (229, FIG. 4) of the in-sea sensor arrangement described above with reference to FIG. 4. The depth of the airgun (106 in FIG. 4; n, n+1, etc. in FIG. 8) may also be measured directly by the source. The measurement of airgun (106 in FIG. 4; n, n+1, etc. in FIG. 8) depth may be facilitated, for example, by a bathymetry sensor or other depth sensor (227, FIG. 4) as described above. Some methods may also include integrating a firing of the airgun (106 in FIG. 4; n, n+1, etc. in FIG. 8) with a navigation system to facilitate airgun (106 in FIG. 4; n, n+1, etc. in FIG. 8) firing at either a precise time or a precise, absolute vertical position, both, or neither. Some of the advantages of firing the airgun (106 in FIG. 4; n, n+1, etc. in FIG. 8) or other seismic source only at precise, absolute, positions are described above.

The navigation system for facilitating airgun (106 in FIG. 4; n, n+1, etc. in FIG. 8) firing at certain vertical positions may be, for example, the GPS system (224, FIG. 4) discussed with reference to FIG. 4, which receives and broadcasts precise position data. The GPS system (224, FIG. 4) may also receive and broadcast a time standard such as UTC. Accordingly, the airgun (106 in FIG. 4; n, n+1, etc. in FIG. 8) may be controlled according to time and position information received from the GPS system (224, FIG. 4), and fired only at a certain, predetermined absolute height (e.g. fixed heights relative to receivers in a borehole) to reduce or eliminate time-shift errors. Further, as mentioned above, according to some methods, the firing of each airgun (106 in FIG. 4; n, n+1, etc. in FIG. 8) may be staggered in time and synchronized with downhole seismic receiver recording according to UTC time or another time standard. Indexing the data according to a time standard facilitates pre-sorting of the data for processing. Indexing the source performance and the receivers' recording according to a time standard also permits these data to be combined in the same dataset or file, thereby facilitating review, reporting, or data processing. Statistical quality control (QC) analysis of surface source performance and the borehole receiver (103, FIG. 4) performance may then be combined. In some cases, firing of the airgun (106 in FIG. 4; n, n+1, etc. in FIG. 8) may also be synchronized with surface seismic receiver recording. Accordingly, statistical quality control (QC) analysis could then be performed for the synchronized data set, including surface source signal, signals received by surface receivers, and signals received by borehole receivers.

According to some methods, a correction is made for source signature variations. Source signature variations may result, for example, from firing pressure air changes, temperature changes, rough seas, or tidal variations. The correction may include calibrating a near field sensor signal received by the hydrophone (210, FIG. 4; 306-310, FIG. 8) located at the airgun (106 in FIG. 4; n, n+1, etc. in FIG. 8) or other seismic source, according to the fixed geometry of the airgun (106 in FIG. 4; n, n+1, etc. in FIG. 8) to the hydrophone (210, FIG. 4; 306-310, FIG. 8). The hydrophone (210, FIG. 4; 306-310, FIG. 8) may be part of the in-sea sensor package discussed above. The correction may further include reconstructing the far field signature of the airgun (106 in FIG. 4; n, n+1, etc. in FIG. 8) or other source from measured near field signature, and maintaining true amplitude for surface seismic calibrations, AVO surveys, and time-lapse surveys. In addition, corrections of the source signature may be made by comparing measured source signatures to a reference source signature, where the reference source signature is based on a seismic source reference far field signature on file at the well site, or acquired by a far field hydrophone deployed with the system (note FIG. 2A).

The preceding description has been presented only to illustrate and describe certain embodiments. It is not intended to be exhaustive or to limit the invention to any precise form disclosed. Many modifications and variations are possible in light of the above teaching.

The embodiments and aspects were chosen and described in order to best explain the principles of the invention and its practical application. The preceding description is intended to enable others skilled in the art to best utilize the principles in various embodiments and aspects and with various modifications as are suited to the particular use contemplated. It is intended that the scope of the invention be defined by the following claims.

What is claimed is:

1. A method of borehole seismic survey, comprising:
   deploying a first seismic source and a second seismic source at or near a sea surface at predetermined fixed depths relative to one or more sensors located in a borehole;
   synchronizing seismic source firing with the borehole sensors recording so that seismic waves generated by the seismic sources are received by the borehole sensors;
   firing the first seismic source under water at a first depth at a first time;
   recording first seismic signals from the first seismic source with the borehole sensors, the first seismic signals having a first frequency content;
   firing the second seismic source at a second, deeper location at a second time;
   recording second seismic signals from the second seismic source with the borehole sensors, the second seismic signals having a second frequency content;
   monitoring a propagation velocity of acoustic energy in water in real time;
   controlling a firing sequence of the seismic sources to delay at least one of the first time and the second time based on the monitored propagation velocity;
   generating source signature data by combining the recorded first seismic signals and second seismic signals,
   wherein a low and high frequency content of the combined source signature data is extended relative to the first frequency content of the first seismic source and the second frequency content of the second seismic source.

2. A method according to claim 1, further comprising:
   firing additional seismic sources; recording additional seismic signals having additional frequency content from the additional seismic sources with the borehole sensors; and
   combining the recorded additional seismic signals with the recorded first seismic signals and second seismic signals.

3. A method according to claim 2, wherein at least three seismic sources are sequentially fired under water at different corresponding depths.

4. A method according to claim 1, wherein the recorded seismic signals are combined using a deghosting algorithm.

5. A method according to claim 1, wherein the low and high frequency content of the combined source signature data is from about 5 Hz to about 250 Hz.

6. A method according to claim 5, wherein a frequency content of each of the first and second seismic sources is from about 10-150 Hz.

7. A method according to claim 1, wherein combining the recorded seismic signals comprises smoothing out and minimizing ghost notches in the frequency domain so as to extend the low and high frequency content of the combined source signature data.

8. A method according to claim 1, wherein the firing sequence is controlled based on a determined stabilization time such that the propagation velocity is within a predetermined range.

9. A method according to claim 1, further comprising:
   firing the first and second seismic sources at a constant, absolute firing height of the seismic sources to compensate for variations in marine conditions.

10. A method according to claim 1, wherein the first and second seismic sources comprise airguns.

11. A method according to claim 1, wherein the first and second seismic sources comprise marine vibrators.

12. A method according to claim 1, wherein the first and second seismic sources comprise waterguns.

13. A method according to claim 1, wherein the source signature data are utilized for purposes of marine VSP survey.

14. A method according to claim 13, wherein the VSP survey comprises a wireline seismic survey.

15. A method according to claim 13, wherein the VSP survey comprises a while-drilling seismic survey.

16. A method according to claim 13, wherein the VSP survey comprises a permanent monitoring survey.

17. A method according to claim 1, further comprising:
   firing multiple shots with a plurality of seismic sources; and
   combining the recorded seismic signals,
   wherein the plurality of seismic sources are fired consecutively with a source at a deeper location being fired after a source at a shallower location.

18. A method according to claim 1, wherein firing of the first seismic source deployed at a shallower depth is delayed.

19. A borehole seismic survey system comprising:
   at least a first seismic sensor configured or designed for deployment in a borehole;
   a first seismic source configured or designed for deployment under water at a predetermined fixed first location relative to the borehole sensor;
   a second seismic source configured or designed for deployment under water at a predetermined fixed second, deeper location spaced vertically from the first seismic source relative to the borehole sensor;
   a controller operatively connected to the first and second seismic sources and the first seismic sensor and configured or designed to synchronize the firing of the first seismic source at a first time and the second seismic source at a second time with borehole sensor recording,
   wherein the system is programmed to
      monitor a propagation velocity of the acoustic energy in water in real time,
      control a firing sequence of the seismic sources to delay at least one of the first time and the second time based on the monitored propagation velocity,
      record first seismic signals having a first frequency content and second seismic signals having a second frequency content received by the borehole seismic sensor from the first seismic source and the second seismic source, respectively, and to generate source signature data by combining the recorded first seismic signals and second seismic signals such that a low and high frequency content of the combined source signature data is extended relative to the first frequency content of the first seismic source and the second frequency content of the second seismic source.

20. A seismic system according to claim 19, further comprising:

a third seismic source configured or designed to be deployed at a predetermined fixed third location spaced vertically from the second seismic source, wherein the controller is programmed to consecutively fire the first, second and third seismic sources such that a source at a deeper location is fired after a source at a shallower location.

21. A seismic system according to claim 19, wherein the controller is programmed to fire the seismic sources based on a constant, absolute firing height of the seismic sources to compensate for variations in marine conditions.

22. A seismic system according to claim 19, wherein each of the seismic sources comprises an air gun.

23. A seismic system according to claim 19, further comprising:

a second seismic sensor and a third seismic sensor configured or designed to be deployed local to the first seismic source and the second seismic source, respectively.

24. A seismic system according to claim 19, further comprising:

a plurality of additional seismic sources configured or designed to be deployed at respective predetermined fixed locations vertically spaced from the second seismic source, wherein the controller is programmed to adjust the firing time of each of the seismic sources such that a deeper source is fired after a shallower source.

25. A seismic system according to claim 19, further comprising: a far field hydrophone configured or designed for deployment at a distance from the seismic sources.

26. A seismic system according to claim 19, wherein firing of the first seismic source deployed at a shallower depth is delayed.

27. A borehole seismic survey system comprising:

a plurality of receivers deployed in a subsea borehole;

a seismic source array aligned vertically in-sea at or near the sea surface such that each source of the source array is located at a corresponding predetermined fixed depth relative to the borehole receivers;

an in-sea source controller configured to synchronize the firing of the seismic source array with borehole receiver recording and to sequentially fire the individual sources of the seismic source array such that at least first seismic signals having a first frequency content and second seismic signals having a second frequency content are received by the borehole receivers from a first seismic source and a second seismic source of the seismic source array, the first and second seismic sources being fired at first and second times, respectively, monitor a propagation velocity of acoustic energy in water in real time, and control a firing sequence of the seismic sources to delay at least one of the first time and the second time based on the monitored propagation velocity, wherein the borehole seismic survey system is configured to combine the first frequency content and second frequency content such that a low and high frequency content of a combined source signature data is extended relative to the source signature of the first seismic source and the source signature of the second seismic source.

28. A survey system according to claim 27, further comprising:

a synchronization unit operatively connected to the plurality of receivers and the controller, wherein the synchronization unit synchronizes the sequential source firing with recording of the plurality of receivers deployed in the subsea borehole.

29. A survey system according to claim 27, wherein the in-sea source controller is configured to dynamically change the sequential firing of the individual sources of the seismic source array based one or more of the propagation velocity; and a constant, absolute firing height of the seismic sources to compensate for variations in marine conditions.

30. A survey system according to claim 27, wherein firing of the first seismic source or the second seismic source deployed at a shallower depth is delayed.

* * * * *